United States Patent Office 3,019,603
Patented Feb. 6, 1962

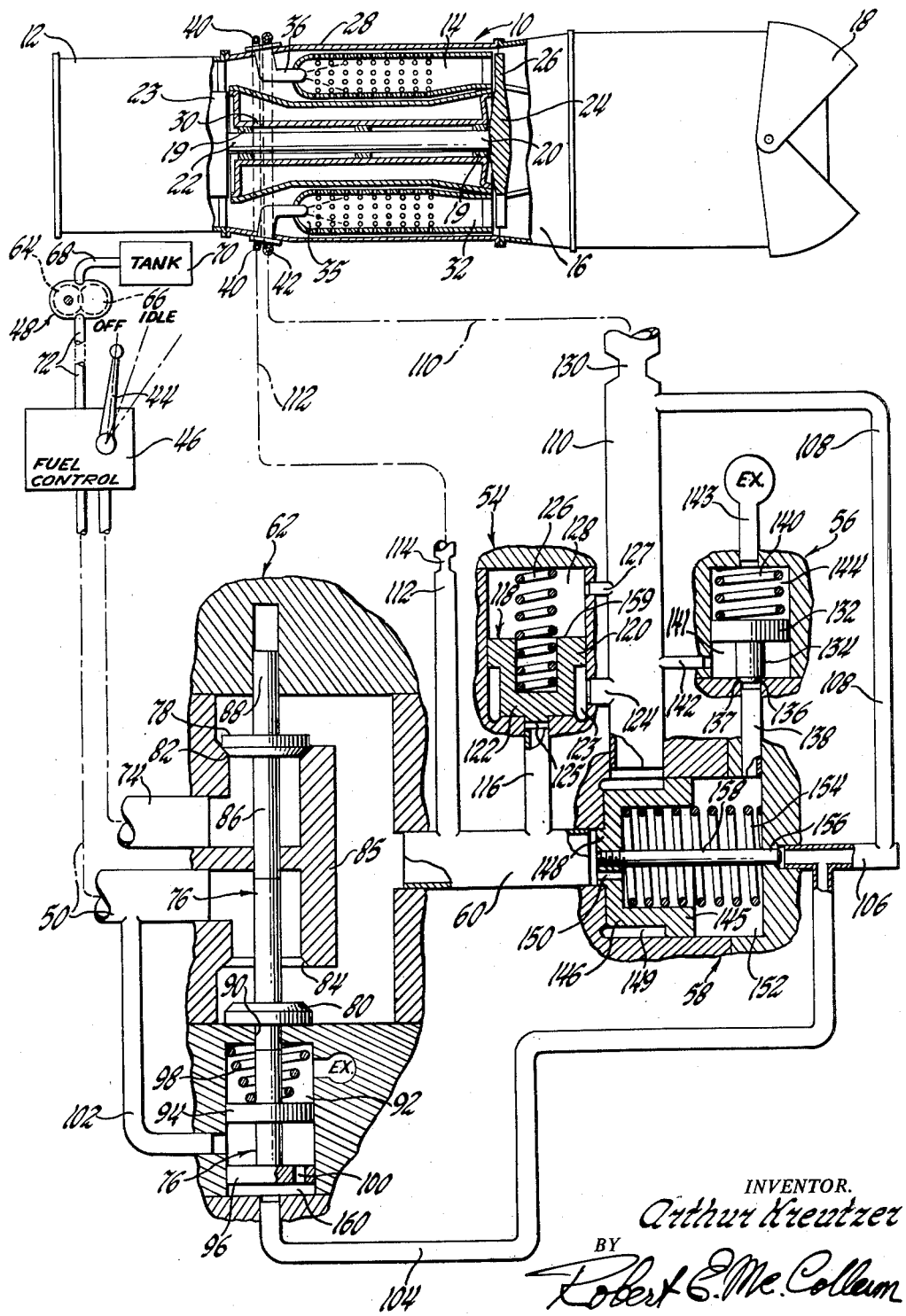

3,019,603
FUEL DISTRIBUTING SYSTEM
Arthur Kreutzer, Brooklyn, N.Y., assignor to General Motors Corporation, Detroit, Mich., a corporation of Delaware
Filed Dec. 31, 1958, Ser. No. 784,379
11 Claims. (Cl. 60—39.28)

This invention relates to a gas turbine engine.

More specifically, this invention relates to a control system for starting of a gas turbine engine. The starting of large gas turbine engines provided with conventional single fuel manifolds poses problems. Due to the large quantities of air passed through the engine, a considerable amount of fuel must be supplied to the combustion chamber before proper atomization of the fuel is accomplished and a combustible mixture is obtained. However, because of the metering of the fuel at a specified design acceleration rate through the fuel control, enough fuel may have been spilled into the combustion chamber during the time it takes for the build-up in pressure of the fuel in the manifold, that a "hot-start" may occur upon engine light-off.

This invention eliminates the hot-start condition by providing an engine starting fuel supply system having primary and secondary fuel manifolds with valving operative to distribute the fuel to the manifolds in accordance with the hydraulic pressures of the fuel in the manifolds. Cooperating with the primary and secondary manifolds is a fuel nozzle having a number of spray jets, one set of spray jets cooperating with the primary manifold for initial engine light-off, and the remaining spray jets cooperating with the secondary manifold for normal running conditions of the engine. Normally controlling the flow of fuel to the combustion section of the engine is a conventional fuel control permitting only a specified amount of fuel to be fed to the fuel nozzles, the amount being predetermined or scheduled in accordance with performance requirements, etc. The starting system controls engine start by rendering the fuel control inoperative during the starting cycle by by-passing fuel therethrough freely to the primary manifold and thereafter through the fuel pressure responsive valving to the secondary manifold. Subsequently, a fuel pressure signal renders the fuel control again operative to place the fuel system on scheduled flow. This assures smooth and consistent starts, improves atomization of fuel for engine light-off, and decreases the time required to start the engine.

Therefore, it is one of the objects of this invention to provide a starting system having a fuel control mechanism by-passing fuel past the fuel control to a primary and secondary manifold during starting until a signal is received that the engine is ready to be put on its scheduled flow pattern.

Another object of this invention is to provide a starting fuel system that increases the atomization of fuel for engine light-off, provides smooth and consistent starts, and decreases the time required to start the engine.

Other features, advantages and objects will become apparent by reference to the detailed description of the invention and to the drawing wherein there is shown the preferred embodiment of this invention.

Referring now to the drawing, the figure therein is a schematic illustration with parts broken away and in section of a gas turbine engine together with an enlarged schematic portion of the control system therefor embodying this invention.

Referring to the figure, a gas turbine engine 10 is shown having a compressor section 12, a combustion section 14, a turbine section 16 and a variable exhaust nozzle 18. Centrally located therein on bearings 19 for rotation about the engine casing is an engine shaft 20 connected at one end 22 to the rotor 23 of a conventional axial flow type compressor to rotate the same. At its other end, shaft 20 is splined or otherwise suitably connected to a turbine rotor 24 having turbine blades 26 formed thereon for driving shaft 20 in the conventional manner. The engine casing 28 together with an internal annular casing 30 provides an annular combustion chamber having therein a plurality of circumferentially spaced combustion cans 32 for the combustion of fuel therein. At the dome end 35 of each of the cans 32 is a fuel nozzle 36 provided with suitable separate passages (not shown) connected with annular primary and secondary fuel manifolds 40 and 42, the primary manifold being smaller in flow area than the secondary manifold.

Further details of the engine beyond that shown in the figure are believed unnecessary since they may be conventional and are well known in the art to which this invention pertains, and are not essential to an understanding of the present invention.

Before proceeding with a detailed description of the portion of the fuel control system embodying this invention, a brief resume of the operation thereof will serve to clarify the invention. Initially, in conditioning the gas turbine engine for operation, after cranking of the engine to a speed at which ignition will occur, the operator controlled throttle lever 44 is moved to idle position conditioning the fuel control 46 to pass fuel freely therethrough to the relatively small diametered primary manifold 40, from which fuel is delivered through the nozzles 36 to the combustion section for engine light-off. After light-off, the pressure in the primary manifold increases up to a predetermined level, whereupon a by-pass valve 54 is opened to feed the fuel to the secondary manifold 42. At a predetermined pressure level in the secondary manifold, a pilot valve 56 is opened thereby permitting the opening of a main flow valve 58 to connect the fuel directly from a fuel pump 48 to the secondary manifold. The movement of the main flow valve 58 simultaneously causes a signal pressure to act on a fuel control shunt valve 62 closing the fuel by-pass and rendering the fuel control operative to schedule the fuel to the primary and secondary manifolds in accordance with the design acceleration conditions of the engine.

Referring now more in particular to the details of the fuel control system, the fuel pump 48, which may be of a conventional type such as the positive displacement gear type shown, has a driving gear 64 rotated from the engine shaft by the conventional accessory drive mechanism (not shown) and meshing with a driven gear 66. A fuel inlet 68 is shown connected to a fuel reservoir tank 70, while the outlet 72 of the pump is connected to the fuel control 46. The details of the fuel control have not been shown as they do not constitute a part of this invention, are not believed to be necessary for a proper understanding of the invention, and may be conventional. Suffice it to state that the fuel control contains a shut-off valve closed in response to movement of the throttle lever 44 to its "off" position to shut off all fuel flow from the pump. The fuel control also contains a by-pass conduit as well as a fuel metering valve simultaneously supplied with fuel under pressure from the fuel pump when the throttle lever is moved to "idle" position, the by-pass feeding fuel from the fuel pump unrestrictedly through the fuel control to the conduit 50 while the metering valve automatically gages fuel therethrough into a conduit 74 in accordance with a predetermined "schedule" as determined by the performance requirements of the engine controlled by such factors as altitude, acceleration desired, etc.

Controlling the flow of fuel from lines 50 and 74 to the manifolds is a shunt valve assembly 62 consisting of a reciprocating type piston valve 76 slideably mounted in the valve body and having spaced lands 78 and 80 alternately seated on seats 82 and 84, respectively, provided in the valve body 85. Lands 78 and 80 alternately control the flow of fuel to the manifolds from the repective conduits 74 and 50. Joining lands 78 and 80 is a stem 86 slideably supported at one end 88 in a guide bore in the valve body, and extending at its other end through the valve body at 90 into a chamber 92, wherein the stem has formed thereon spaced lands 94 and 96 for a purpose to be described. Positioned between land 94 and the valve body is a compression spring 98 biasing the valve to the position shown seating land 78 and unseating land 80.

Land 96 is provided with a metering orifice 100 restrictively controlling the communication of fuel between a fuel line 102 connected to the fuel control by-pass conduit 50 and a shunt valve fuel signal line 104 connected by branch lines 106 and 108 to the secondary manifold supply fuel line 110.

Therefore, in its initial position as previously stated, shunt valve 76 is positioned as shown by spring 98 blocking the scheduled fuel flow line 74 and opening the unscheduled or by-pass fuel line 50 to a main fuel line 60. At the same time, fuel is fed through line 102 to the space between lands 94 and 96 and metered through orifice 100 to the conduit 104 leading to the secondary manifold supply line 110; however, because of the metering, the flow thereto is small and does not appreciably affect the flow of fuel through conduit 50.

The fuel in conduit 60 is fed to the primary manifold 40 directly through the relatively small branch conduit 112. An orifice 114 is provided in line 112 to permit a build-up of pressure therein and to control the flow to the primary manifold.

The flow of fuel from conduit 60 to the secondary manifold is controlled by the by-pass valve 54, the pilot valve 56, and the main flow valve 58. As shown, by-pass valve 54 controls the flow of fuel through a line 116 leading to the secondary manifold, and is of the poppet or quick acting type consisting of a piston-type valve 118 slidably mounted within the valve body and having a piston 120 and a boss 122 together with the valve body defining an annular passage 123 connecting with the secondary manifold supply line 110 through line 124. Boss 122 is formed with a plug 125 of the same diameter as line 116 blocking line 116 when the boss is seated against the valve body. A compression spring 126 seated between the valve body and the end of a guide bore in the valve body biases the valve to the closed position as shown. A passage 127 drains any fuel that may have accumulated in the chamber 128.

Pilot valve 56 consists of a piston 132 slidably mounted within the valve body and having a stem 134 with a beveled end 136 normally seated in a mating portion 137 of the valve body. A spring 140 seated between the valve body and the piston biases the stem into seating arrangement to close off communication between a conduit 138 and a conduit 142 connected to supply line 110. An exhaust line 143 connects chamber 144 to the atmosphere.

The main flow control valve 58 is of substantially the same construction as by-pass valve 54 and consists of a piston 145 slidably mounted within the valve body, a boss 146 thereon with a plug 148 of the same diameter as conduit 60, the boss 146, piston 145 and the valve body together defining an annular passage 149 connected to supply line 110 when the boss is seated against the valve body. A spring 154 seated between the valve body and the end of a bore in the valve normally biases the valve to its closed position. Chamber 152 is drained through conduit 138. Additionally, a fuel metering orifice 150 is provided in the plug 148 for communicating the fuel in conduit 60 to the opposite side of the piston and chamber 152 to aid in maintaining the valve closed until the proper time. Secured to plug 148 and slideably and sealingly extending through the valve body at 156 to be received snugly within the conduit 106 is a stem valve 158 for blocking the flow of fuel through conduit 104 as will be described later.

Referring now to the combined operation of by-pass valve 54, pilot valve 56 and main flow valve 58, the main flow of fuel to the secondary manifold is from conduit 60 past main flow valve 58 to supply line 110; however, for quick starting, the secondary manifold is filled with fuel through the by-pass valve 54 as will now be described. The valves are initially positioned as shown because of the action of springs 126, 140 and 154, and therefore prevent any communication of fuel to the secondary manifold. The fuel in line 60 initially fills chamber 152 of the main flow valve 58 through the metering orifice 150, the drain 138 being closed by the seating of stem 134 of the pilot valve 56 in the valve seat 137. Spring 154 is therefore aided in maintaining the main valve closed. As soon as the primary manifold is filled with fuel through line 112, the pressure in lines 60 and 116 will build-up against both plugs 125 and 148 of the by-pass valve 54 and main valve 58, respectively, until it is sufficient (150 p.s.i., for example) acting against the smaller area of plug 125 to unseat the plug and open by-pass valve 118 against the force of spring 126, thereby connecting the fuel in lines 60 and 116 to line 124 and the secondary manifold supply line 110. Once plug 125 is unseated, the larger boss area then exposed to the fuel pressure reduces the pressure necessary to maintain the by-pass valve open (to say 40 p.s.i., for example) thereby providing a hysteresis effect. The secondary manifold then begins to fill with fuel through the orifice 130 and the pressure will begin to rise in lines 110, 142 and chamber 141 in the pilot valve 56 until approximately 20 p.s.i., for example, is reached, whereupon the pressure acting on the face of piston 132 moves the pilot valve 56 against the force of spring 140 to unseat stem 134 and open main valve drain line 138 to line 110. Since the fuel in chamber 152 is at a higher pressure (substantially primary manifold pressure) than that in the secondary manifold supply line 110, the fuel in chamber 152 will flow out through line 138 into the line 110 past unseated stem 134 of the pilot valve. The primary manifold pressure in conduit 60 acting against the area of plug 148 of the main flow piston is then sufficient to crack open the main valve by unseating the plug and boss to start feeding fuel directly to the secondary manifold from line 60. As soon as plug 148 is moved off its seat exposing a greater area of the boss 146 to the primary manifold pressure in conduit 60, a resultant snap action or quick movement of the main valve to its wide open position is effected freely communicating the fuel in line 60 to the secondary manifold supply conduit 110. The fuel in chamber 128 of the by-pass valve 54 is then of a pressure equal to the pressure of the fuel on the opposite side of the valve permitting spring 126 to close the valve. Once the valve is closed, the pressure acting on the larger area 159 of the piston as compared to the area of plug 125 will maintain the valve closed until engine shutdown.

Simultaneously with the movement of the main valve to the right, stem valve 158 enters conduit 106 to block line 104 stopping the drain of fuel therethrough from the shunt valve chamber 92, and permitting a build-up of the pressure in chamber 160 of the shunt valve assembly against land 96 thereby moving the valve 76 against the action of spring 98 and any unbalance in the fuel pressure to seat land 80 blocking the flow of fuel through line 50 and unseat land 78 to open line 74. This rise in pressure in line 104 will be hereinafter termed "signal" pressure rise since it denotes the condition wherein the build up in pressure in chamber 160 indicates or "signals" that the starting system is being conditioned for a change-over from unscheduled to scheduled flow. It is to be noted that the larger surface area of land 96 in chamber 160 enables the fuel pressure acting thereon to overcome the force of the spring and any unbalanced fuel pressure force acting against either side of the lands 78 and 80.

This movement of the shunt valve therefore shuts off the unscheduled flow of fuel from the pump through the fuel control and line 50, and now directs all fuel through the metering valve in the fuel control, through conduit 74 and past land 78 to the main fuel conduit 60. This change in position of the shunt valve therefore effects all further delivery of fuel directly to both manifolds through the controlled or scheduled system of the fuel control.

Therefore, a brief description of the general operation of this system is as follows. With the engine ready for starting, the throttle lever 44 is maintained in its "off" position closing the shut-off valve (not shown) in the fuel control until the engine has been cranked to a speed at which ignition will occur. The throttle lever is then moved to its idle position opening the shut-off valve and feeding fuel into the by-pass line and metering valve (not shown) to lines 50 and 74. The position of the valves of the control system will be as shown whereby fuel will then be fed directly from the fuel pump through the fuel control by-pass and line 50 past unseated land 80 of the shunt valve to fuel conduit 60 and to the primary manifold through line 112. As soon as light-off is accomplished, the pressure of the fuel in the primary manifold, conduits 112, 60 and 116 builds up to unseat by-pass valve 54 and begin filling the secondary manifold through line 110. Upon the secondary manifold pressure increasing to 20 p.s.i., pilot valve 56 moves unblocking line 138 and draining the fuel behind the piston 145 of the main flow valve to the secondary manifold supply line. The main flow valve then is opened by primary manifold presure, the fuel in line 60 is communicated directly to the secondary manifold, and by-pass valve 54 is closed. The opening of the main flow valve moves stem 158 to close line 104 thereby effecting movement of the shunt valve by the signal pressure to close the unscheduled flow line 50 and open scheduled line 74. Thereafter, all fuel is fed through line 74 and the metering valve in the fuel control takes over all fuel feeding operation of the engine automatically in accordance with the position of the operator's throttle lever 44 and other conditions.

Upon engine shutdown, the valves will return to the position shown in the drawing, and will be in a condition for engine starting once again.

Thus, it will be seen that this invention provides a quick starting mechanism for effecting a fast and safe start of a large gas turbine engine.

The invention provides scheduling of fuel to the combustion cans in response to the hydraulic pressure of the fuel in the manifolds, with the fuel control being by-passed during the starting cycle until a signal pressure rise indicates the fuel is to go on its scheduled flow pattern. This invention therefore decreases the time required to start the engine, provides better atomization for engine light-off and provides smooth and consistent starts.

What is claimed is:

1. A fuel distributing system for a gas turbine engine having a fuel nozzle, a plurality of fuel manifolds connected to said fuel nozzle, a source of fuel under pressure, a plurality of conduit means connecting said source and said manifolds, said conduit means including means connecting said source and one of said manifolds at all times, and means in the remaining of said conduit means controlling the distribution of fuel to the remaining of said manifolds, said latter means including a plurality of fluid pressure operated movable devices, a first of said devices operable in response to a predetermined pressure of the fuel in said one manifold to communicate a limited flow of fuel to a second of said manifolds, a second of said devices operable in response to a predetermined pressure of fuel in said second manifold thereagainst to permit movement of a third of said devices by fuel thereagainst at the pressure of the fuel in said one manifold, movement of said third device providing free communication of the fuel moving said third device from said source to said second manifold through said conduit means.

2. A fluid distributing system comprising a plurality of fluid manifolds, a source of fluid under pressure, conduit means connecting the fluid from said source to said manifolds, and control means in said conduit means controlling the distribution of fluid to said manifolds, one of said conduit means connecting the fluid from said source to one of said manifolds at all times, a restricted fluid by-pass conduit connected at one portion to said one of said conduit means and at another portion to a conduit means connected to another of said manifolds, said control means including movable means in said by-pass conduit responsive to a predetermined pressure of the fluid in said one manifold to communicate fluid to said another of said manifolds, said control means also including movable means in said conduit means connected to said another manifold movable by the fluid thereagainst at the presence of the fluid in said one manifold to freely communicate the said fluid from said source to said another manifold upon moving said last named movable means, and means preventing movement of said last named movbale means below a predetermined pressure of the fluid in said another manifold.

3. A fuel distributing system for a gas turbine engine having a fuel nozzle and a plurality of fuel manifolds each connected thereto for the flow of fuel therethrough, a first source of fuel under pressure, a different source of fuel under pressure, conduit means connecting said sources and said manifolds, movable control means within said conduit means operable in response to the pressure of fuel in one of said manifolds for controlling the distribution of fuel from said first source to said manifolds, and other control means in the conduit means between said sources and said first named control means moveable between positions alternately connecting said sources to said first named control means, said other control means in one position connecting the fuel from said first source to said manifolds, said other control means being moveable to another position by the pressure of fuel thereagainst from said first source in response to the movement of said first named control means by the fuel thereagainst at the pressure of the fuel in said one manifold to deliver the fuel from said source different source to all of said manifolds.

4. A fuel distributing system comprising a plurality of fuel manifolds, a source of fuel under pressure, conduit means connecting said source and said manifolds for the flow of fuel therebetween, and fluid pressure responsive means in said conduit means controlling the distribution of fuel through said manifolds, said fluid pressure responsive means including means responsive to a predetermined pressure level of the fuel in one of said manifolds for distributing a limited flow of fuel to a second of said maniolds, and means movable by fuel thereagainst at the pressure of the fuel in said one manifold and operable at a predetermined pressure level of the fuel in said second manifold for effecting a free flow of the said fuel to said second manifold upon moving said movable means.

5. A fluid distributing system comprising primary and secondary fluid manifolds, a source of fluid under pressure, primary and secondary fluid lines connecting said source and said primary and secondary manifolds, means in said secondary line movable between closed and open positions blocking or unblocking said line to control the flow of fluid therethrough, and other means providing a restricted flow of fluid to said second manifold, said secondary line movable means being movable to an open position by the blocked fluid at primary manifold pressure acting thereagainst to freely admit the secondary line fluid to said secondary manifold upon the attainment of a predetermined pressure of the fluid in said secondary manifold.

6. A fluid distributing system comprising primary and secondary fluid manifolds, a source of fluid under pressure, primary and secondary fluid lines connecting said source and said primary and secondary manifolds, means in said secondary line movable between closed and open positions blocking or unblocking said line to control the flow of fluid therethrough, and a restricted fluid flow shunt line connected to said second line by-passing said means, said secondary line means being movable to an open position by the secondary line fluid at primary manifold pressure acting thereagainst to freely admit the secondary line fluid to said secondary manifold upon the attainment of a predetermined pressure of the fluid in said secondary manifold.

7. A fluid distribution system comprising first and second fluid manifolds, a source of fluid under pressure, first and second fluid conduits connected to said source and to said first and second manifolds, respectively, providing a flow of fluid to said manifolds, movable means in said second conduit blocking the flow of fluid therethrough, a restricted flow conduit connected at opposite ends to said second conduit shunting the flow of fluid around said movable means to said secondary manifold, movable means in said restricted conduit blocking the same and preventing the flow of fluid therethrough, said latter movable means being movable by a force of fluid at a predetermined first manifold pressure in said restricted conduit acting thereagainst to a position unblocking the restricted conduit, the second conduit movable means being movable by the fluid therein at first manifold pressure acting thereagainst to a position unblocking said second conduit means upon the attainment of a predetermined fluid pressure in the second manifold to freely pass the second conduit fluid to said second manifold.

8. A fluid distribution system comprising first and second fluid manifolds, a source of fluid under pressure, a plurality of conduit means including first and second fluid conduits connected to said source and to said first and second manifolds, respectively, providing a flow of fluid to said manifolds, movable means in said second conduit blocking the flow of fluid therethrough, a restricted flow conduit connected at opposite ends to said second conduit shunting the flow of fluid around said movable means to said secondary manifold, movable means in said restricted conduit blocking the same and preventing the flow of fluid therethrough, said latter movable means being movable by the force of fluid at a predetermined first manifold pressure in said restricted conduit acting thereagainst to a position unblocking the restricted conduit, other conduit means connected at one end to said secondary conduit between said second conduit movable means and second manifold and at its other end to a portion of said second conduit movable means opposite to that in contact with the fluid from said source, and movable means in said other conduit means in one position preventing the movement of said second conduit movable means and movable in response to a predetermined secondary manifold fluid pressure acting thereagainst to a second position effecting movement of the second conduit movable means by the fluid in said second conduit at first manifold pressure acting thereagainst to a position unblocking said second conduit means and freely passing the second conduit fluid to said second manifold.

9. A fluid distributing system comprising first and second sources of fluid under pressure providing, respectively, a first flow of fluid in accordance with a predetermined schedule and a second unscheduled fluid flow, first and second fluid manifolds, and conduit means connecting said manifolds and sources to each other, control means adjacent each of said sources and movable between positions alternatingly connecting said sources to said manifolds, means biasing said control means to a position providing a flow of unscheduled fluid to said manifolds, movable means blocking the free flow of unscheduled fluid to said second manifold, other means providing a restricted flow of fluid to said second manifold, said movable means being movable to a flow unblocking position by the blocked fluid at first manifold pressure acting thereagainst upon the attainment of a predetermined second manifold pressure to freely admit the fluid to said second manifold, and means on said movable means effecting a movement of said control means to a position supplying scheduled flow of fluid to said manifolds upon movement of said movable means to its unblocking position.

10. A fluid distributing system comprising first and second sources of fluid under pressure providing, respectively, a first flow of fluid in accordance with a predetermined schedule and a second unscheduled fluid flow, first and second fluid manifolds, and conduit means connecting said manifolds and sources to each other, control means adjacent each of said sources and movable between positions alternatingly connecting said sources to said manifolds, means biasing said control means to a position providing a flow of unscheduled fluid to said manifolds, movable means blocking the free flow of unscheduled fluid to said second manifold, a restricted flow means by-passing a restricted flow of fluid past said movable means to said second manifold, said movable means being movable to a flow unblocking position by the blocked fluid at first manifold pressure acting thereagainst upon the attainment of a predetermined second manifold pressure to freely admit the fluid to said second manifold, and means on said movable means effecting a movement of said control means by the force of unscheduled fluid acting thereagainst and against said biasing means to a position supplying scheduled flow of fluid to said manifolds upon movement of said movable means to its unblocking position.

11. A fluid distributing system comprising first and second sources of fluid under pressure providing, respectively, a first flow of fluid in accordance with a predetermined schedule and a second unscheduled fluid flow, first and second fluid manifolds, and a plurality of conduits connecting said manifolds and sources to each other, control means adjacent said sources and movable between positions alternatingly connecting said sources to said manifolds, means biasing said control means to a position providing a flow of unscheduled fluid to said manifolds, first movable means in said conduit connected to said second manifold blocking the flow of unscheduled fluid therethrough, a restricted flow conduit connected at opposite ends to said second manifold conduit shunting the flow of fluid around said first movable means to said secondary manifold, second movable means in said restricted conduit blocking the same and preventing the flow of fluid therethrough, said second movable means being movable by a force of fluid at a predetermined first manifold pressure in said restricted conduit acting thereagainst to a position unblocking the restricted conduit, the first movable means being movable by the blocked fluid at first manifold pressure acting thereagainst to a position unblocking said second manifold conduit means upon the attainment of a predetermined fluid pressure in the second manifold to freely pass the fluid to said second manifold.

References Cited in the file of this patent

UNITED STATES PATENTS

| 2,636,553 | Ballantyne | Apr. 28, 1953 |
| 2,667,742 | Kuzmitz | Feb. 2, 1954 |
| 2,667,743 | Lee | Feb. 2, 1954 |

FOREIGN PATENTS

| 654,122 | Great Britain | June 6, 1951 |